US012637565B2

(12) United States Patent
Torii et al.

(10) Patent No.: US 12,637,565 B2
(45) Date of Patent: May 26, 2026

(54) RESIN COMPOSITION, LAYERED BODY INCLUDING RESIN COMPOSITION LAYER, LAYERED BODY, FLEXIBLE COPPER-CLAD LAMINATE, FLEXIBLE FLAT CABLE, AND ELECTROMAGNETIC WAVE SHIELDING FILM

(71) Applicant: TOAGOSEI CO., LTD., Tokyo (JP)

(72) Inventors: Masahiro Torii, Nagoya (JP); Yuya Okimura, Nagoya (JP); Hironori Kutsuna, Nagoya (JP); Makoto Hirakawa, Nagoya (JP); Masashi Yamada, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 984 days.

(21) Appl. No.: 17/778,985

(22) PCT Filed: Nov. 25, 2020

(86) PCT No.: PCT/JP2020/043902
§ 371 (c)(1),
(2) Date: May 23, 2022

(87) PCT Pub. No.: WO2021/106960
PCT Pub. Date: Jun. 3, 2021

(65) Prior Publication Data
US 2022/0411630 A1      Dec. 29, 2022

(30) Foreign Application Priority Data

Nov. 27, 2019      (JP) ................................ 2019-214475

(51) Int. Cl.
| | |
|---|---|
| *C08L 75/06* | (2006.01) |
| *B32B 15/092* | (2006.01) |
| *B32B 15/095* | (2006.01) |
| *B32B 15/20* | (2006.01) |
| *C08L 63/04* | (2006.01) |

(52) U.S. Cl.
CPC ............ *C08L 75/06* (2013.01); *B32B 15/092* (2013.01); *B32B 15/095* (2013.01); *B32B 15/20* (2013.01); *C08L 63/04* (2013.01); *B32B 2311/12* (2013.01); *B32B 2363/00* (2013.01); *B32B 2375/00* (2013.01); *B32B 2457/08* (2013.01); *C08L 2203/16* (2013.01); *C08L 2203/202* (2013.01)

(58) Field of Classification Search
CPC ...... C08L 75/06; C08L 63/04; C08L 2203/16; C08L 2203/202; C08L 63/00; B32B 15/092; B32B 15/095; B32B 15/20; B32B 2311/12; B32B 2363/00; B32B 2375/00; B32B 2457/08; B32B 1/00; B32B 2255/10; B32B 2255/26; B32B 2307/202; B32B 2307/206; C08G 18/3206; C08G 18/348; C08G 18/4211; C08G 18/246; C08G 18/42; C08G 18/4219; C08G 18/73; C09J 175/06; H05K 1/03
See application file for complete search history.

(56) References Cited

U.S. PATENT DOCUMENTS

2022/0259427 A1      8/2022   Okimura et al.

FOREIGN PATENT DOCUMENTS

| | | | | |
|---|---|---|---|---|
| CN | 105492534 A | 4/2016 | | |
| CN | 114040943 A | 2/2022 | | |
| JP | 64-90216 | 4/1989 | | |
| JP | 2005-125724 | 5/2005 | | |
| JP | 2007-154134 | 6/2007 | | |
| JP | 2010-084005 | 4/2010 | | |
| JP | 2015-008282 | 1/2015 | | |
| JP | 2015069877 A | 4/2015 | | |
| JP | 5846290 | 1/2016 | | |
| KR | 20160061916 A | 6/2016 | | |
| WO | WO2006088127 A1 | 8/2006 | | |
| WO | WO-2006126305 A1 * | 11/2006 | ............ | C08G 18/00 |
| WO | WO 2015/046032 | 4/2015 | | |
| WO | WO-2015046032 A1 * | 4/2015 | ........... | C08G 18/348 |
| WO | WO 2017/110326 | 6/2017 | | |

OTHER PUBLICATIONS

Translation of WO 2015-046032. (Year: 2015).*
PCT International Search Report (w/ English translation) for corresponding PCT Application No. PCT/JP2020/043902, mailed on Dec. 18, 2020, 5 pages.
Japanese Office Action (w/ English machine translation) for corresponding Application No. 2021-561465, dated Mar. 5, 2024, 6 pages.
Japanese Office Action (w/ English translation) for corresponding Application No. 2021-561465, dated Jul. 30, 2024, 5 pages.
Chinese Office Action (w/ English Translation) for corresponding Chinese Patent Application No. 202080082087.5, dated Mar. 3, 2023, 16 pages.
Korean Office Action (w/English translation) for corresponding Application No. 10-2022-7019967, mailed on May 28, 2025, 13 pages.

* cited by examiner

*Primary Examiner* — K. Boyle
(74) *Attorney, Agent, or Firm* — Dority & Manning, PA

(57) ABSTRACT

A resin composition including a polyester polyurethane resin (A); and an epoxy resin (B), in which a molecular weight per a urethane bond of the polyester polyurethane resin (A) is from 200 to 8,000, and a layered body including a resin composition layer, a layered body, a flexible copper-clad laminate, a flexible flat cable, or an electromagnetic wave shielding film, each using the resin composition.

15 Claims, No Drawings

RESIN COMPOSITION, LAYERED BODY INCLUDING RESIN COMPOSITION LAYER, LAYERED BODY, FLEXIBLE COPPER-CLAD LAMINATE, FLEXIBLE FLAT CABLE, AND ELECTROMAGNETIC WAVE SHIELDING FILM

CROSS-REFERENCE TO RELATED APPLICATIONS

The present application is related and has right of priority to JP 2019-214475, which was filed on Nov. 27, 2019 in the Japanese Patent Office, and is a U.S. national phase entry of PCT/JP2020/043902, which was filed on Nov. 25, 2020, both of which are incorporated by reference in their entireties for all purposes.

TECHNICAL FIELD

The present invention relates to a polyester polyurethane-based resin composition as a material effective for producing a printed wiring board, particularly a flexible printed wiring board or a build-up method multi-layer printed wiring board, which is high in adhesive force to polyimide films or metals, a cured product of which has heat resistance and moist heat resistance, and which is excellent in liquid stability or processability. Further, the present invention relates to a bonding film in which the resin composition is bonded to a release film, a layered body including a resin composition layer in which the resin composition is bonded to a base film, a layered body including a layer that is obtained by curing the resin composition, a flexible copper-clad laminate or a flexible flat cable, and an electromagnetic wave shielding film that is bonded to a flexible printed wiring board or the like to be preferably used for shielding electromagnetic noise generated from an electric wiring.

BACKGROUND ART

Since flexible printed wiring boards can be mounted three-dimensionally and at high density even in a limited space, applications thereof have been expanding. In recent years, along with miniaturization, weight reduction, and the like of electronic devices, related products of flexible printed wiring hoards have been diversified, and the demand therefor has been increasing. As such related products, there are flexible copper-clad laminates in which copper foils are affixed to polyimide films, flexible printed wiring boards in which electronic wirings are formed on flexible copper-clad laminates, flexible printed wiring boards including reinforcing plates in which the flexible printed wiring boards and the reinforcing plates are affixed to each other, multilayer plates in which flexible copper-clad laminates or flexible printed wiring boards are layered and joined, and the like. In a case where flexible copper-clad laminates are produced, for example, adhesives are typically used for the bonding polyimide film and the copper foil.

As conventional adhesive compositions or conventional layered bodies, the methods described in Patent Documents 1 to 3 are known.

Patent Document 1 describes a halogen-free flame retardant adhesive composition, characterized by containing a solvent-soluble polyamide resin (A) in a solid state at 25° C., a phenoxy resin (B), an epoxy resin (C) that does not contain a halogen atom, and a phosphorus-based flame retardant (D) that has a structure represented by the following general formula (1), in which the epoxy resin (C) is an epoxy resin that has three or more epoxy groups in one molecule, in which the content of the phenoxy resin (B) is from 100 to 450 parts by mass with respect to 100 parts by mass of the polyamide resin (A), in which the content of the epoxy resin (C) is from 1 to 60 parts by mass with respect to 100 parts by mass in total of the polyamide resin (A) and the phenoxy resin (B), and in which the content of the phosphorus-based flame retardant (D) is from 5 to 100 parts by mass with respect to 100 parts by mass in total of the polyamide resin (A) and the phenoxy resin (B).

Further, Patent Document 2 describes a layered body, characterized in that a curable resin composition is layered on at least one surface of a polyimide-based film, a polyester-based film, or a metal foil, in which the curable resin composition contains a polyester-based polymer (a) that contains two or more carboxyl groups in a molecule, that has a number average molecular weight of from 5,000 to 100,000, and that has a molecular weight per carboxyl group of from 1,500 to 10,000, an epoxy resin (b) that contains two or more epoxy groups in a molecule, and an epoxy resin curing promoter (c), in which the curable resin composition can retain thermoplasticity at 5° C. for a period of 5 months or longer. Patent Document 2 also describes a layered body, in which the curable resin composition of the above-described layered body has been cured to be layered on a metal foil (including a metal wiring).

Further, Patent Document 3 describes a resin composition for an adhesive, the composition containing a polyurethane resin (a) that contains a carboxy group, that has an acid value (unit: equivalent/$10^6$ g) of from 100 to 1,000, that has a number average molecular weight of from $5.0 \times 10^3$ to $1.0 \times 10^5$, and that has a glass transition temperature of from −10° C. to 70° C., an epoxy resin (b) that contains a nitrogen atom, and an epoxy resin (c) that has a dicyclopentadiene skeleton, in which a formulation ratio of the resin (b) is from 0.1% by mass to 20% by mass with respect to the whole epoxy resin contained in the resin composition.

PRIOR ART DOCUMENT

Patent Documents

Patent Document 1: Japanese Patent Publication No. 5846290

Patent Document 2: Japanese Patent Application Laid-Open (JP-A) No. 2005-125724

Patent Document 3: Japanese Patent Application Laid-Open (JP-A) No. 2010-84005

SUMMARY OF INVENTION

Technical Problem

An object to be solved by the present invention is to provide a resin composition that provides a cured product having excellent conductivity and adhesiveness even after a long-term (1,000 hours) storage under environment of high temperature and high humidity (60° C., 95% RH).

Another object to be solved by the present invention is to provide a layered body including a resin composition layer, a layered body, a flexible copper-clad laminate, a flexible flat cable, or an electromagnetic wave shielding film, each using the resin composition.

Solution to Problem

Means for solving the problem described above include the following aspects.

<1> A resin composition including a polyester polyurethane resin (A); and an epoxy resin (B), wherein a molecular weight per a urethane bond of the polyester polyurethane resin (A) is from 200 to 8,000.

<2> The resin composition according to <1>, wherein a diol component configuring the polyester polyurethane resin (A) contains a diol having a side chain.

<3> The resin composition according to any one of <1> or <2>, wherein the polyester polyurethane resin (A) includes a polyester polyurethane resin having a polyester structure that has a number average molecular weight of from 8,000 to 30,000.

<4> The resin composition according to any one of <1> to <3>, wherein the polyester polyurethane resin (A) has a number average molecular weight of from 10,000 to 80,000.

<5> The resin composition according to any one of <1> to <4>, wherein the polyester polyurethane resin (A) has an acid value of 0.1 mgKOH/g to 20 mgKOH/g.

<6> The resin composition according to any one of <1> to <5>, wherein the polyester polyurethane resin (A) has a glass transition temperature of from 30° C. to 150° C.

<7> The resin composition according to any one of <1> to <6>, wherein a content of the epoxy resin (B) is from 1 part by mass to 30 parts by mass with respect to 100 parts by mass of the polyester polyurethane resin (A).

<8> The resin composition according to any one of <1> to <7>, wherein the epoxy resin (B) comprises a bisphenol novolak type epoxy resin.

<9> A layered body including a resin composition layer, the layered body including: a resin composition layer that consists of the resin composition according to any one of <1> to <8>, a B-stage state resin composition layer obtained by partially curing the resin composition, or a cured layer obtained by curing the resin composition; and a base film that is in contact with at least one surface of the resin composition layer, the B-stage stage resin composition layer, or the cured layer.

<10> A layered body, including a cured layer obtained by curing the resin composition according to any one of <1> to <8>.

<11> A flexible copper-clad laminate including: a copper foil; a cured layer obtained by curing the resin composition according to any one of <1> to <8>; and a base material.

<12> A flexible flat cable including: a copper wire; a cured layer obtained by curing the resin composition according to any one of <1> to <8>; and a covering material.

<13> An electromagnetic wave shielding film including a resin composition layer that consists of the resin composition according to any one of <1> to <8>, a B-stage state resin composition layer obtained by partially curing the resin composition, or a cured layer obtained by curing the resin composition.

According to the present invention, it is possible to provide a resin composition that provides a cured product having excellent conductivity and adhesiveness even after a long-term (1,000 hours) storage under environment of high temperature and high humidity (60° C., 95% RH).

In addition, according to the present invention, it is possible to provide a layered body including a resin composition layer, a layered body, a flexible copper-clad laminate, a flexible flat cable, or an electromagnetic wave shielding film, each using the resin composition.

DESCRIPTION OF EMBODIMENTS

The explanation of constituent elements described below may be made based on representative embodiments of the present invention, but the present invention is not limited to such embodiments. Herein, the range "(from) X to Y" is used to mean a range that includes the numerical values X and Y described before and after "to" as the lower limit value and the upper limit value, respectively.

In the numerical range described herein stepwise, the upper limit value or the lower limit value described in one numerical range may be replaced with the upper limit value or the lower limit value of another numerical range described stepwise. Further, in the numerical range described herein, the upper limit value or the lower limit value of the numerical range may be replaced with the value indicated in the examples.

In the present invention, the amount of each component in the composition means, when multiple substances corresponding to each component are present in the composition, the total amount of the multiple substances that are present in the composition, unless otherwise specified.

In the present invention, the term "step" includes not only an independent step, but also a step that is not clearly distinguished from another step but that achieves the intended purpose of the step.

In the present invention, "% by mass" and "% by weight" are synonymous, and "parts by mass" and "parts by weight" are synonymous.

Further, in the present invention, a combination of two or more preferable embodiments is a more preferable embodiment.

Further, "(meth)acrylic" herein represents both an acrylic and a methacrylic, or either of them.

In addition, in the present disclosure, the "main chain" represents a relatively longest bonded chain in the molecule of the polymer compound constituting the resin, and the "side chain" represents a carbon chain branched from the main chain.

Furthermore, in some of the compounds herein, the hydrocarbon chain may be expressed by a simplified structural formula that omits the symbols of carbon (C) and hydrogen (H).

Hereinafter, the present invention will be described in detail.

(Resin Composition)

The resin composition of the present invention contains a polyester polyurethane resin (A) and an epoxy resin (B), and a molecular weight per a urethane bond of the polyester polyurethane resin (A) is from 200 to 8,000.

The resin composition of the present invention can be preferably used as an adhesive composition, can be more preferably used as an adhesive composition for adhesion with polyimides or metals, and can be particularly preferably used as an adhesive composition for adhesion between polyimides and metals.

The present inventors have found that conventional resin compositions are not sufficient in terms of conductivity and adhesiveness after a long-term storage under environment of high temperature and high humidity in the resulting cured product.

As a result of intensive studies by the present inventors, a resin composition contains the polyester polyurethane resin (A) and the epoxy resin (B), and the molecular weight per a urethane bond in the polyester polyurethane resin (A) is from 200 to 8,000, although the detailed mechanism is unknown, so that it has been found that these two kinds of resins can act in concert with each other and complement each other to provide a resin composition that provides a cured product having excellent conductivity and adhesiveness even after a long-term storage under environment of high temperature and high humidity.

In addition, since the resin composition of the present invention contains the polyester polyurethane resin (A) and the epoxy resin (B), and the molecular weight per a urethane bond in the polyester polyurethane resin (A) is from 200 to 8,000, the resin composition is excellent in initial or post-solder adhesiveness and initial or post-solder conductivity.

In particular, the resin composition of the present invention contains the polyester polyurethane resin (A) and the epoxy resin (B), and the molecular weight per a urethane bond in the polyester polyurethane resin (A) is from 200 to 8,000, so that the resin composition has high adhesive strength with polyimide and metal, excellent appearance after solder formation, excellent heat resistance, and excellent insulation reliability.

Herein, "polyester polyurethane resin (A)" and the like are also referred to as "component (A)" and the like.

<Polyester Polyurethane Resin (A)>

The resin composition of the present invention contains a polyester polyurethane resin (A), and the molecular weight per a urethane bond in the polyester polyurethane resin (A) is from 200 to 8,000.

The polyester polyurethane resin (A) may be a resin having two or more ester bonds and two or more urethane bonds, and is preferably a resin having a polyester chain and two or more urethane bonds.

Further, the polyester polyurethane resin (A) is preferably a resin that is obtained by a reaction of at least a polyester polyol, a polyisocyanate, and a chain extender as raw materials thereof, and is more preferably a resin that is obtained by a reaction of at least a polyester polyol, a polyisocyanate, and a diol compound.

The molecular weight per a urethane bond in the polyester polyurethane resin (A) is from 200 to 8,000, and is preferably from 250 to 5,000, more preferably from 300 to 2,000, still more preferably from 500 to 1,500, and particularly preferably from 700 to 1,000, from the viewpoints of conductivity and heat resistance.

The molecular weight per a urethane bond in the polyester polyurethane resin (A) in the present invention is determined from the number average molecular weight Mn of the polyester polyurethane resin (A)/the average number of urethane bonds of the polyester polyurethane resin (A).

The polyester portion of the polyester polyurethane resin (A) is preferably formed from an acid component and an alcohol component.

As the acid component, a polyvalent carboxylic acid compound is preferable, and a dicarboxylic acid compound is more preferable. Further, as the acid component, a sulfocarboxylic acid compound or the like can also be used. Further, preferred examples of the acid component include an aromatic acid.

As the alcohol component, a polyvalent alcohol compound is preferable, and a diol compound is more preferable.

Further, the polyester portion may be formed from a hydroxycarboxylic acid compound.

When the total amount of the whole acid component configuring the polyester portion of the polyester polyurethane resin (A) is 100 mol %, the aromatic acid is preferably 30 mol % or more, more preferably 45 mol % or more, and particularly preferably 60 mol % or more of the whole acid component, from the viewpoint of adhesiveness, heat resistance and, moist heat resistance.

Examples of the aromatic acid include aromatic dicarboxylic acids, such as terephthalic acid, isophthalic acid, orthophthalic acid, naphthalenedicarboxylic acid, biphenyldicarboxylic acid, and 5-hydroxyisophthalic acid. Also, examples thereof can include: an aromatic dicarboxylic acid having a sulfonic acid group or a sulfonate group, such as sulfoterephthalic acid, 5-sulfoisophthalic acid, 4-sulfophthalic acid, 4-sulfonaphthalene-2,7-dicarboxylic acid, 5-(4-sulfophenoxy)isophthalic acid, sulfoterephthalic acid, and/or a metal salt thereof, and an ammonium salt thereof; and an aromatic oxycarboxylic acid, such as p-hydroxybenzoic acid, p-hydroxyphenylpropionic acid, p-hydroxyphenylacetic acid, 6-hydroxy-2-naphthoic acid, 4,4-bis(p-hydroxyphenyl)valeric acid. Among these, from the viewpoint of adhesiveness, the acid component preferably includes terephthalic acid and/or isophthalic acid, and is particularly preferably terephthalic acid and/or isophthalic acid.

Further, the acid component may be a derivative of an acid compound, such as an ester, at the time of resin synthesis.

Other examples of the acid component can include: alicyclic dicarboxylic acids, such as 1,4-cyclohexanedicarboxylic acid, 1,3-cyclohexanedicarboxylic acid, 1,2-cyclohexanedicarboxylic acid and its acid anhydride; and aliphatic dicarboxylic acids, such as succinic acid, adipic acid, azelaic acid, sebacic acid, dodecanedioic acid, and dimer acid.

On the other hand, preferred examples of the polyvalent alcohol component include aliphatic diol compounds, alicyclic diol compounds, aromatic-containing diol compounds, and ether bond-containing diol compounds.

Examples of the aliphatic diol compound can include ethylene glycol, 1,2-propylenediol, 1,3-propanediol, 1,4-butanediol, 1,5-pentanediol, neopentyl glycol, 1,6-hexanediol, 3-methyl-1,5-pentanediol, 1,9-nonanediol, 2-butyl-2-ethyl-1,3-propanediol, neopentyl glycol hydroxypivalate, dimethylol heptane, and 2,2,4-trimethyl-1,3-pentanediol.

Examples of the alicyclic diol compound can include 1,4-cyclohexanediol, 1,4-cyclohexanedimethanol, tricyclodecanediol, tricyclodecanedimethylol, a spiroglycol, hydrogenated bisphenol A, an ethylene oxide adduct of hydrogenated bisphenol A, and a propylene oxide adduct of hydrogenated bisphenol A.

Examples of the aromatic-containing diol compound can include paraxylene metaxylene glycol, orthoxylene glycol, 1,4-phenylene glycol, an ethylene oxide adduct of 1,4-phenylene glycol, bisphenol A, and a glycol that is obtained by adding 1 mol to several mols of ethylene oxide or propylene oxide to two phenolic hydroxyl groups of a bisphenol, such as an ethylene oxide adduct of bisphenol A and a propylene oxide adduct of bisphenol A.

Examples of the ether bond-containing diol compound include diethylene glycol, triethylene glycol, dipropylene glycol, polyethylene glycol, polypropylene glycol, polytetramethylene glycol, an ethylene oxide adduct of neopentyl glycol, and a propylene oxide adduct of neopentyl glycol.

Among these diols, a diol having a side chain, such as neopentyl glycol and 2-butyl-2-ethyl-1,3-propanediol, is preferable due to compatibility with epoxy resins, or the like and solution stability.

Accordingly, the diol component configuring the polyester polyurethane resin (A) preferably includes a diol having a side chain, from the viewpoints of compatibility with epoxy resins, or the like and solution stability.

Above all, from the viewpoints of compatibility with epoxy resins, or the like, solution stability, and conductivity, the chain extender configuring the polyester polyurethane resin (A) preferably includes a diol having a side chain. Accordingly, the polyester polyurethane resin (A) is preferably a resin that is obtained by a reaction of at least a polyester polyol, a polyisocyanate, and a diol having a side chain as raw materials thereof, from the viewpoints of compatibility with epoxy resins, or the like, solution stability, and conductivity.

In addition, a hydroxycarboxylic acid compound having a hydroxy group and a carboxy group in the molecular structure can also be used as the polyester raw material, examples of which can include 5-hydroxyisophthalic acid, p-hydroxybenzoic acid, p-hydroxyphenethyl alcohol, p-hydroxyphenylpropionic acid, p-hydroxyphenylacetic acid, 6-hydroxy-2-naphthoic acid, and 4,4-bis(p-hydroxyphenyl)valeric acid.

As the component configuring the polyester portion of the polyester polyurethane resin (A), a tri- or higher functional polycarboxylic acid and/or polyol may be further copolymerized at a ratio of from about 0.1 mol % to about 5 mol % with respect to the whole acid component or the whole polyvalent alcohol component that configures the polyester portion, for the purpose of introducing a branched skeleton as needed. In particular, in the case of reacting with a curing agent to obtain a cured layer, introduction of a branched skeleton increases terminal group density (reaction site) of the resin, by which a cured layer that is high in crosslinking density can be obtained. Examples of the tri- or higher functional polycarboxylic acid that can be used in this case include a compound, such as trimellitic acid, trimesic acid, ethyleneglycol bis(anhydrotrimellitate), glycerol tris(anhydrotrimellitate), trimellitic anhydride, pyromellitic anhydride (PMDA), oxydiphthalic dianhydride (ODPA), 3,3',4,4'-benzophenone tetracarboxylic dianhydride (BTDA), 3,3',4,4'-diphenyltetracarboxylic dianhydride (BPDA), 3,3',4,4'-diphenylsulfonetetracarboxylic dianhydride (DSDA), 4,4'-(hexafluoroisopropylidene)diphthalic dianhydride (6FDA), and 2,2'-bis[(dicarboxyphenoxy)phenyl]propane dianhydride (BSAA). On the other hand, examples of the tri- or higher functional polyol that can be used include glycerin, trimethylolethane, trimethylol propane, and pentaerythritol. In the case of using the tri- or higher functional polycarboxylic acid and/or polyol, it may be copolymerized preferably in a range of from 0.1 mol % to 5 mol %, and more preferably in a range of from 0.1 mol % to 3 mol %, with respect to the whole acid component or the whole polyvalent alcohol component.

Acid addition of from about 0.1 mol % to about 10 mol % can be performed with respect to the whole acid component or the whole polyvalent alcohol component that configures the polyester portion, for the purpose of introducing a carboxy group into the polyester portion of the polyester polyurethane resin (A) as needed. Since use of a monocarboxylic acid, a dicarboxylic acid, or a polyfunctional carboxylic acid compound for acid addition causes decrease in molecular weight due to transesterification, it is preferable to use an acid anhydride.

As the acid anhydride, a compound, such as succinic anhydride, maleic anhydride, orthophthalic acid, 2,5-norbornanedicarboxylic anhydride, tetrahydrophthalic anhydride, trimellitic anhydride, pyromellitic anhydride (PMDA), oxydiphthalic dianhydride (ODPA), 3,3',4,4'-benzophenonetetracarboxylic dianhydride (BTDA), 3,3',4,4'-diphenyltetracarboxylic dianhydride (BPDA), 3,3',4,4'-diphenylsulfonetetracarboxylic dianhydride (DSDA), 4,4'-(hexafluoroisopropylidene)diphthalic dianhydride (6FDA), and 2,2'-bis[(dicarboxyphenoxy)phenyl]propane dianhydride (BSAA), can be used.

Acid addition can be carried out, after polyester polycondensation, directly in a bulk state or by solubilizing the polyester and carrying out the addition. The reaction in a bulk state progresses quickly. However, when acid addition is carried out in a large amount, gelation may occur and the reaction may progress at a high temperature; therefore, care is required in terms, for example, of blocking oxygen gas to prevent oxidation. On the other hand, the reaction of acid addition in a solution state progresses slowly, but a large amount of carboxy groups can be stably introduced.

The polyisocyanate that is used for producing the polyester polyurethane resin (A) may be: one of a diisocyanate, a dimer thereof (uretdione), a trimer thereof (isocyanurate, triol adduct, burette), or the like; or a mixture of two or more thereof. Examples of the diisocyanate component include 2,4-tolylene diisocyanate, 2,6-tolylene diisocyanate, p-phenylene diisocyanate, diphenylmethane diisocyanate, m-phenylene diisocyanate, hexamethylene diisocyanate, trimethylhexamethylene diisocyanate, tetramethylene diisocyanate, 3,3'-dimethoxy-4,4'-biphenylene diisocyanate, 1,5-naphthalene diisocyanate, 2,6-naphthalene diisocyanate, 4,4'-diisocyanate diphenyl ether, m-xylylene diisocyanate, 1,3-diisocyanate methylcyclohexane, 1,4-diisocyanate methylcyclohexane, 4,4-diisocyanate cyclohexane, 4,4'-diisocyanate cyclohexylmethane, isophorone diisocyanate, dimer acid diisocyanate, and norbornene diisocyanate. Among these, an aliphatic or alicyclic diisocyanate is preferable from the viewpoint of transparency. Further, hexamethylene diisocyanate or isophorone diisocyanate is particularly preferable due to availability and economic reasons.

If necessary, a chain extender may be used in producing the polyester polyurethane resin (A).

Examples of the chain extender include the diol compound described as a constituent component of the polyester portion, and a compound having one carboxy group and two hydroxy groups, such as 2,2-bis(hydroxymethyl)propionic acid and 2,2-bis(hydroxymethyl)butyric acid.

Among these, from the viewpoint of conductivity, the chain extender is preferably a diol compound, more preferably a diol compound having a side chain, and particularly preferably a diol compound having a branched chain.

That is, the diol component configuring the polyester polyurethane resin (A) preferably contains a diol having a side chain, and particularly preferably contains a diol compound having a branched chain, from the viewpoint of conductivity.

From the viewpoint of conductivity, the diol compound having a side chain preferably includes at least one compound selected from the group consisting of neopentyl glycol, 2-butyl-2-ethyl-1,3-propanediol, and 2,2-bis(hydroxymethyl)propionic acid, and particularly preferably includes 2,2-bis(hydroxymethyl)propionic acid and at least one compound selected from the group consisting of neopentyl glycol and 2-butyl-2-ethyl-1,3-propanediol.

The method of producing the polyester polyurethane resin (A) is not particularly limited, and a publically known method can be used. For example, the polyester polyol, the polyisocyanate, and the optional chain extender may be charged collectively or may be charged separately in a reaction vessel. In any case, the reaction is carried out at a ratio of functional group of isocyanate group/hydroxy group of preferably from 0.9 to 1.1, more preferably from 0.98 to 1.02, and particularly preferably 1, which relates to the total hydroxyl value of the polyester polyol and the chain extender, and the entirety of isocyanate groups of the polyisocyanate in the system. Further, this reaction can be carried out under the presence or absence of a solvent that is inert to isocyanate groups, thereby enabling the production. Examples of the solvent include ester-based solvents (such as ethyl acetate, butyl acetate, ethyl butyrate), ether-based solvents (such as dioxane, tetrahydrofuran, diethyl ether), ketone-based solvents (such as cyclohexanone, methyl ethyl ketone, methyl isobutyl ketone), aromatic hydrocarbon-based solvents (such as benzene, toluene, xylene), and mixed solvents thereof, and ethyl acetate and/or methyl ethyl ketone is preferable from the viewpoint of reduction in environmental load. The reaction apparatus is not limited to a reaction can equipped with a stirring apparatus, and a mixing-kneading apparatus such as a kneader or a twin-screw extruder can also be used therefor.

In order to promote the urethane reaction, it is possible to use a catalyst that is used in ordinary urethane reactions, examples of which include tin-based catalysts (such as trimethyltin laurate, dimethyltin dilaurate, trimethyltin hydroxide, dimethyltin dihydroxide, stannous octoate), lead-based catalysts (such as lead oleate, lead-2-ethylhexonate), and amine-based catalysts (such as triethylamine, tributylamine, morpholine, diazabicyclooctane, diazabicycloundecene).

The glass transition temperature (Tg) of the polyester portion the polyester polyurethane resin (A) is preferably from 40° C. to 150° C., more preferably from 45° C. to 120° C., further preferably from 50° C. to 90° C., and particularly preferably from 60° C. to 70° C., from the viewpoints of adhesiveness, conductivity, and heat resistance.

Further, the glass transition temperature (Tg) of the polyester polyurethane resin (A) is preferably from 30° C. to 150° C., more preferably from 40° C. to 140° C., and particularly preferably from 50° C. to 120° C., from the viewpoints of adhesiveness, conductivity, and heat resistance.

The number average molecular weight (Mn) of the polyester polyurethane resin (A) is preferably from 5,000 to 100,000, more preferably from 10,000 to 80,000, further preferably from 20,000 to 60,000, and particularly preferably from 25,000 to 50,000, from the viewpoints of conductivity and heat resistance.

The values of the number average molecular weight (Mn) and the weight average molecular weight (Mw) of the resin in the present invention can be obtained by gel permeation chromatography (GPC), respectively.

The acid value of the polyester polyurethane resin (A) is preferably from 0 mgKOH/g to 50 mgKOH/g, more preferably from 0.1 mgKOH/g to 20 mgKOH/g, further preferably from 0.1 mgKOH/g to 5 mgKOH/g, and particularly preferably from 1.0 mgKOH/g to 5.0 mgKOH/g, from the viewpoints of adhesiveness and conductivity.

The acid value of the polyester polyurethane resin (A) is preferably from 20 mgKOH/g or less, and particularly preferably 5 mgKOH/g or less, from the viewpoint of heat resistance.

The acid value of the resin in the present invention is determined by a measurement method of neutralization titration of a sample with a potassium hydroxide benzyl alcohol solution using a phenolphthalein solution as an indicator.

The polyester polyurethane resin (A) preferably contains a polyester polyurethane resin having a polyester structure having a number average molecular weight of from 1,000 to 50,000, more preferably contains a polyester polyurethane resin having a polyester structure having a number average molecular weight of from 2,000 to 40,000, further preferably contains a polyester polyurethane resin having a polyester structure having a number average molecular weight of from 3,000 to 30,000, and particularly preferably contains a polyester polyurethane resin having a polyester structure having a number average molecular weight of from 8,000 to 30,000, from the viewpoints of adhesiveness, conductivity, and heat resistance.

The resin composition of the present invention may contain the polyester polyurethane resin (A) singly or in combination of two or more thereof.

The content of the polyester polyurethane resin (A) is preferably from 30% by mass to 99% by mass, more preferably from 50% by mass to 95% by mass, and particularly preferably from 70% by mass to 90% by mass with respect to the total amount of the resin solid content excluding a filler component in the resin composition from the viewpoints of adhesiveness, conductivity, and heat resistance.

The resin solid content excluding a filler component refers to a resin component (a polyester polyurethane resin (A), an epoxy resin (B), and the like) which is a nonvolatile component excluding an organic filler, a metal filler, and an inorganic filler other than the metal filler described later, and a curing promoter described later, and the resin component and the curing promoter may be solid or liquid at normal temperature (25° C.).

Furthermore, from the viewpoint of adhesiveness, electrical conductivity, and heat resistance, in the resin composition of the present invention, the content of the polyester polyurethane resin (A) is preferably from 10% by mass to 70% by mass with respect to the total amount of the resin solid content excluding a filler component.

<Epoxy Resin (B)>

The resin composition of the present invention contains an epoxy resin (B).

The epoxy resin (B) is a component that imparts adhesiveness, heat resistance to a cured portion after adhesion, and the like. The epoxy resin (B) in the present invention encompasses not only a polymer compound that has an epoxy group but also a low molecule compound that has an epoxy group. The number of epoxy group in the epoxy resin (B) is preferably 2 or more.

Examples of the epoxy resin (B) include: glycidyl esters, such as orthophthalic acid diglycidyl ester, isophthalic acid diglycidyl ester, terephthalic acid diglycidyl ester, p-hydroxybenzoic acid diglycidyl ester, tetrahydrophthalic acid diglycidyl ester, succinic acid diglycidyl ester, adipic acid diglycidyl ester, sebacic acid diglycidyl ester, trimellitic acid triglycidyl ester; glycidyl ethers, such as a diglycidyl ether of bisphenol A and an oligomer thereof, ethylene glycol diglycidyl ether, propylene glycol diglycidyl ether, 1,4-butanediol diglycidyl ether, 1,6-hexanediol diglycidyl ether, trimethylolpropane triglycidyl ether, pentaerythritol tetraglycidyl ether, tetraphenyl glycidyl ether ethane, triphenyl glycidyl ether ethane, a polyglycidyl ether of sorbitol, a polyglycidyl ether of polyglycerol; novolac type epoxy resins, such as a phenol novolac epoxy resin, an o-cresol novolak epoxy resin, a bisphenol A novolak epoxy resin.

Further, a brominated bisphenol A type epoxy resin to which flame-retardance is imparted, a phosphorus-containing epoxy resin, a dicyclopentadiene skeleton-containing epoxy resin, a naphthalene skeleton-containing epoxy resin, an anthracene type epoxy resin, a tertiary butyl catechol type epoxy resin, a biphenyl type epoxy resin, a bisphenol S type epoxy resin, and the like can also be used.

Among them, the epoxy resin (B) preferably includes a bisphenol type epoxy resin and/or a novolak type epoxy resin, from the viewpoints of adhesiveness and heat resistance, and more preferably includes a bisphenol type epoxy resin and a phenol novolac type epoxy resin.

In the present invention, the epoxy resin (B) preferably includes a compound that has three or more epoxy groups in one molecule, in order to achieve high heat resistance after curing. When such a compound is used, cross-linking reactivity with the polyester polyurethane resin (A) is higher than the case of using an epoxy resin that has two epoxy groups, resulting in that sufficient heat resistance can be obtained.

The content of the compound that has three or more epoxy groups in one molecule in the epoxy resin (B) is preferably 15% by mass or more, more preferably 20% by mass or more, and particularly preferably 25% by mass or more, with respect to the total mass of the epoxy resin (B), from the viewpoint of heat resistance.

The resin composition of the present invention may contain the epoxy resin (B) singly or in combination of two or more thereof.

The content of the epoxy resin (B) is preferably from 0.5 parts by mass to 60 parts by mass, more preferably from 1 part by mass to 30 parts by mass, and particularly preferably from 3 parts by mass to 25 parts by mass, with respect to 100 parts by mass of the polyester polyurethane resin (A), from the viewpoints of adhesiveness, conductivity, and heat resistance.

<Organic Filler>

The resin composition of the present invention preferably contains an organic filler, from the viewpoints of elongation, conductivity, and moist heat resistance of a resulting cured product.

Examples of the organic filler include (meth)acrylic resin particles, polybutadiene particles, nylon particles, polyolefin particles, polyester particles, polycarbonate particles, polyvinyl alcohol particles, polyvinyl ether particles, polyvinyl butyral particles, silicone rubber particles, polyurethane particles, phenolic resin particles, and polytetrafluorinated ethylene particles.

The present inventors have found that, when the organic filler is mixed with the polyester polyurethane resin (A) and the epoxy resin (B), an effect of further enhancing compatibility of these resins.

Further, as the organic filler, from the viewpoints of further improving the compatibility and liquid stability of these resins, silicone particles, polybutadiene particles, (meth)acrylic resin particles, and polyurethane particles are particularly preferable.

From the viewpoint of conductivity, (meth)acrylic resin particles or polyurethane particles are preferable.

The average particle diameter of the organic filler is not particularly limited, and is preferably from 0.5 μm to 50 μm, and more preferably from 1 μm to 30 μm, from the viewpoints of coatability and adjustability of coating thickness.

The resin composition of the present invention may contain the organic filler singly or in COM nation of two or more thereof.

From the viewpoints of adhesiveness, conductivity, and curability, the content of the organic filler is preferably from 1 part by mass to 50 parts by mass, more preferably from 5 parts by mass to 40 parts by mass, and particularly preferably from 10 parts by mass to 20 parts by mass, with respect to 100 parts by mass of the total amount of the resin solid content excluding the filler component in the resin composition.

<Metal Filler>

The resin composition of the present invention preferably contains a metal filler, from the viewpoints of conductivity and heat resistance.

The metal filler is preferably a conductive filler from the viewpoints of conductivity and heat resistance, and more preferably metal particles made of a conductive metal such as gold, platinum, silver, copper, or nickel or an alloy thereof. Instead of particles having a single composition, particles having a metal or a resin as a core, a coating layer of which is formed of a highly conductive material, are also preferable from the viewpoint of cost reduction. The core is preferably made of at least one material selected from the group consisting of nickel, silica, copper, and resin, and is more preferably made of a conductive metal or an alloy thereof. The coating layer is preferably a layer made of a material that is excellent in conductivity, and preferably a layer made of a conductive metal or a conductive polymer.

Examples of the conductive metal include gold, platinum, silver, tin, manganese, indium, and an alloy thereof. Examples of the conductive polymer include polyaniline and polyacetylene. Among these, silver is preferable from the viewpoint of conductivity.

From the viewpoints of cost and conductivity, the particles consisting of the core and the coating layer preferably contain the coating layer at a ratio of from 1 parts by mass to 40 parts by mass, and more preferably contain the coating layer at a ratio of from 5 parts by mass to 30 parts by mass, with respect to 100 parts by mass of the core.

The particles consisting of the core and the coating layer are preferably particles in which the coating layer completely covers the core. However, in actual, a part of the core may be exposed. Even in such a case, if the conductive material covers 70% or more of the surface area of the core, conductivity can be easily maintained.

The shape of the metal filler is not limited as long as the desired conductivity can be obtained. Specifically, for example, a spherical shape, a flake shape, a leaf shape, a dendritic shape, a plate shape, a needle shape, a rod shape, or a botryoid shape is preferable.

The average particle diameter of the metal filler is preferably from 1 μm to 100 μm, more preferably from 3 μm to 50 μm, and particularly preferably from 4 μm to 15 μm, from the viewpoints of conductivity and storage stability.

The average particle diameter of particles in the present disclosure is a D50 average particle diameter which is determined by measuring each conductive fine particle powder in a tornado dry powder sample module by means of a laser diffraction/scattering method-particle size distribution measuring device LS 13320 (manufactured by Beckman Coulter), and for which an average of a diameter of particle size at the accumulated value of 50% of the particles is used. The refractive index is set as 1.6.

The average particle diameter of the metal filler can also be determined from an average value of about 20 particles that are randomly selected in the region of an enlarged image (about 1,000× to 10,000× magnification) of an electron microscope. In this case, the average particle diameter is also preferably from 1 μm to 100 μm, and more preferably from 3 μm to 50 μm. If the metal filler has a long axis direction and a short axis direction (for example, rod-shaped particles), the average particle diameter is calculated in terms of length in the long axis direction.

The resin composition of the present invention may contain the metal filler singly or in combination of two or more thereof.

From the viewpoints of conductivity, heat resistance, and storage stability, the content of the metal filler is preferably from 1 part by mass to 500 parts by mass, more preferably from 10 parts by mass to 350 parts by mass, and particularly preferably from 10 parts by mass to 50 parts by mass, with respect to 100 parts by mass of the total amount of the resin solid content excluding the filler component in the resin composition.

The resin composition of the present invention may contain an additive other than the components described above.

As the other additive, a thermoplastic resin other than those described above, a tackifier, a flame retardant, a curing agent, a curing promoter, a coupling agent, a heat aging inhibitor, a leveling agent, a defoamer, an inorganic filler, a solvent, or the like can be contained to an extent that the function of the resin composition is not affected.

Examples of the other thermoplastic resin include a phenoxy resin, a polyester resin, a polycarbonate resin, a polyphenylene oxide resin, a polyurethane resin, a polyacetal resin, a polyethylene resin, a polypropylene resin, and a polyvinyl resin. These thermoplastic resins may be used singly or in combination of two or more thereof.

Examples of the tackifier can include a coumarone-inden resin, a terpene resin, a terpene-phenol resin, a rosin resin, a p-t-butylphenol-acetylene resin, a phenol-formaldehyde resin, a xylene-formaldehyde resin, a petroleum hydrocarbon resin, a hydrogenated hydrocarbon resin, and a turpentine resin. These tackifiers may be used singly or in combination of two or more thereof.

The flame retardant may be either an organic flame retardant or an inorganic flame retardant.

Examples of the organic flame retardant include: a phosphorous flame retardant, such as melamine phosphate, melamine polyphosphate, guanidine phosphate, guanidine polyphosphate, ammonium phosphate, ammonium polyphosphate, ammonium phosphate amide, ammonium polyphosphate amide, carbamate phosphate, carbamate polyphosphate, aluminum trisdiethylphosphinate, aluminum trimethylthiophosphate, aluminum trisdiphenylphosphinate, zinc bisdiethylphosphinate, zinc bismethylethylphosphine, zinc bisdiphenylphosphine, titanyl bisdithiophosphate, titanium tetrakisdiethylphosphine, titanyl bismethylethylphosphinate, titanium tetrakismethylethylphosphinate, titanyl bisdiphenylphosphinate, titanium tetrakisdiphenylphosphinate a nitrogen-based flame retardant, such as a triazine compound (such as melamine, melam, melamine cyanurate), a cyanuric acid compound, an isocyanuric acid compound, a triazole compound, a tetrazole compound, a diazo compound, urea; and a silicon-based flame retardant, such as a silicone compound, a silane compound.

Examples of the inorganic flame retardant include a metal hydroxide, such as aluminum hydroxide, magnesium hydroxide, zirconium hydroxide, barium hydroxide, and calcium hydroxide; a metal oxide, such as tin oxide, aluminum oxide, magnesium oxide, zirconium oxide, zinc oxide, molybdenum oxide, and nickel oxide; and zinc carbonate, magnesium carbonate, calcium carbonate, barium carbonate, zinc borate, and hydrated glass.

These flame retardants may be used singly or in combination of two or more thereof.

The curing agent is a component for forming a cross-linked structure by a reaction with the epoxy resin (B), and examples thereof include: an amine-based curing agent, such as an aliphatic diamine, an aliphatic polyamine, a cyclic aliphatic diamine, and an aromatic diamine; a polyamide amine-based curing agent; an acid-based curing agent, such as an aliphatic polyvalent carboxylic acid, an alicyclic polyvalent carboxylic acid, an aromatic polyvalent carboxylic acid, and an acid anhydride thereof; a basic active hydrogen-based curing agent, such as dicyandiamide and an organic acid dihydrazide; a polymercaptan-based curing agent; a novolak resin-based curing agent; a urea resin-based curing agent; and a melamine resin-based curing agent.

These curing agents may be used singly or in combination of two or more thereof.

Examples of the aliphatic diamine-based curing agent include ethylenediamine, 1,3-diaminopropane, 1,4-diaminobutane, hexamethylenediamine, polymethylenediamine, polyetherdiamine, 2,5-dimethylhexamethylenediamine, and trimethylhexamethylenediamine.

Examples of the aliphatic polyamine-based curing agent include diethylenetriamine, iminobis(hexamethylene)triamine, trihexatetramine, tetraethylenepentamine, aminoethylethanolamine, tri(methylamino)hexane, dimethylaminopropylamine, diethylaminopropylamine, and methyliminobispropylamine.

Examples of the cyclic aliphatic diamine-based curing agent include mensendiamine, isophoronediamine, bis(4-amino-3-methylbicyclohexyl)methane, diaminodicyclohexylmethane, bis(aminomethyl)cyclohexane, N-ethylaminopiperazine, 3,9-bis(3-aminopropyl)-2,4,8,10-tetraoxaspiro[5.5]undecane, and a hydrogenated product of m-xylylenediamine.

Examples of the aromatic diamine-based curing agent include m-phenylenediamine, diaminodiphenylmethane, diaminodiphenylsulfone, diaminodiethyldiphenylmethane, and m-xylylenediamine.

Examples of the aliphatic polyvalent carboxylic acid-based curing agent and acid anhydride-based curing agent include succinic acid, adipic acid, dodecenyl succinic anhydride, polyazipic anhydride, polyazelineic anhydride, and polysevacinic anhydride.

Examples of the alicyclic polyvalent carboxylic acid-based curing agent and acid anhydride-based curing agent include methyltetrahydrophthalic acid, methylhexahydrophthalic acid, methylhymic acid, hexahydrophthalic acid, tetrahydrophthalic acid, trialkyltetrahydrophthalic acid, methylcyclodicarboxylic acid, and an acid anhydride thereof.

Examples of the aromatic polyvalent carboxylic acid-based curing agent and acid anhydride-based curing agent include phthalic acid, trimellitic acid, pyromellitic acid, benzophenone tetracarboxylic acid, ethylene glycol glycol bistrimellitic acid, glycerol tristrimellitic acid, and an acid anhydride thereof.

Examples of the polymercaptan-based curing agent include a mercaptoized epoxy resin and a mercaptopropionic acid ester.

Examples of the novolak-based curing agent include a phenol novolac-based curing agent and a cresol novolak-based curing agent.

In the case in which the resin composition of the present invention contains the curing agent, the content of the curing agent is adjusted such that the functional group equivalent thereof is preferably in a range of from 0.2 mole equivalent to 2.5 mole equivalent, and more preferably in a range of from 0.4 mole equivalent to 2.0 mole equivalent, with respect to 1 mole equivalent of epoxy group of the epoxy resin (B), from the viewpoints of adhesiveness and heat resistance.

The curing promoter is a component used for the purpose of promoting the reaction of the epoxy resin (B), and a tertiary amine-based curing promoter, a tertiary amine salt-based curing promoter, an imidazole-based curing promoter, and the like can be used therefor.

These curing promoters may be used singly or in combination of two or more thereof.

Examples of the tertiary amine-based curing promoter include benzyldimethylamine, 2-(dimethylaminomethyl)phenol, 2,4,6-tris(dimethylaminomethyl)phenol, tetramethylguanidine, triethanolamine, N,N'-dimethylpiperazine, triethylenediamine, and 1,8-diazabicyclo[5.4.0]undecene.

Examples of the tertiary amine salt-based curing promoter include: formate, octylate, p-toluenesulfonate, o-phthalate, phenol salt, or phenol novolak resin salt of 1,8-diazabicyclo[5.4.0]undecene; and formate, octylate, p-toluenesulfonate, o-phthalate, phenol salt, or phenol novolac resin salt of 1,5-diazabicyclo[4.3.0]nonene.

Examples of the imidazole-based curing promoter include 2-methylimidazole, 2-undecylimidazole, 2-heptadecylimidazole, 1,2-dimethylimidazole, 2-methyl-4-ethylimidazole, 2-phenylimidazole, 2-phenyl-4-methylimidazole, 1-benzyl-2-methylimidazole, 1-benzyl-2-phenylimidazole, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazoleisocyanuric acid adduct, 2-phenyl-4,5-dihydroxymethylimidazole, and 2-phenyl-4-methyl-5-hydroxymethylimidazole.

In the case in which the resin composition of the present invention contains the curing promoter, the content of the curies promoter is preferably from 1 part by mass to 10 parts by mass, and more preferably from 2 parts by mass to 5 parts by mass, with respect to 100 parts by mass of the epoxy resin (B), from the viewpoints of adhesiveness and heat resistance.

Examples of the coupling agent include: a silane-based coupling agent, such as vinyl trimethoxysilane, 3-glycidoxypropyltrimethoxysilane, p-styryltrimethoxysilane, 3-methacryloxypropylmethyldimethoxysilane, 3-acryloxypropyltrimethoxysilane, N-2-(aminoethyl)-3-aminopropylmethyldimethoxysilane, 3-ureidopropyltriethoxysilane, 3-mercaptopropylmethyldimethoxysilane, bis(triethoxysilylpropyl)tetrasulfide, 3-isocyanatepropyltriethoxysilane, and imidazole silane; a titanate-based coupling agent, an aluminate-based coupling agent; and a zirconium-based coupling agent. These may be used singly or in combination of two or more thereof.

Examples of the heat aging inhibitor include: a phenol-based antioxidant, such as 2,6-di-tert-butyl-4-methylphenol, n-octadecyl-3-(3',5'-di-tert-butyl-4'-hydroxyphenyl)propionate, and tetrakis[methylene-3-(3,5-di-tert-butyl-4-hydroxyphenyl)propionate]methane; a sulfur-based antioxidant, such as dilauryl-3,3'-thiodipropionate, and dimyristyl-3,3'-dithiopropionate; and a phosphorus-based antioxidant, such as trisnonylphenyl phosphite, and tris(2,4-di-tert-butylphenyl)phosphite. These may be used singly or in combination of two or more thereof.

Examples of the inorganic tiller include a powder made of calcium carbonate, titanium oxide, aluminum oxide, zinc oxide, carbon black, talc, silica, or the like. These may be used singly or in combination of two or more thereof.

The resin composition of the present invention can be prepared by mixing the polyester polyurethane resin (A) and the epoxy resin (B), and, if necessary, the other components.

Since the resin composition of the present invention is preferably used in the state of a solution or a dispersion, it preferably contains a solvent.

Examples of the solvent include: alcohols, such as methanol, ethanol, isopropyl alcohol, n-propyl alcohol, isobutyl alcohol, n-butyl alcohol, benzyl alcohol, ethylene glycol monomethyl ether, propylene glycol monomethyl ether, diethylene glycol monomethyl ether, and diacetone alcohol; ketones, such as acetone, methyl ethyl ketone, methyl isobutyl ketone, methyl amyl ketone, cyclohexanone, and isophorone; aromatic hydrocarbons, such as toluene, xylene, ethyl benzene, mesitylene; esters, such as methyl acetate, ethyl acetate, ethylene glycol monomethyl ether acetate, and 3-methoxybutyl acetate; aliphatic hydrocarbons, such as hexane, heptane, cyclohexane, and methylcyclohexane. These solvents may be used singly or in combination of two or more thereof. When the resin composition of the present invention is in the state of a solution or a dispersion that contains a solvent, coating onto an adherend and formation of a resin composition layer can be facilitated, and a resin composition layer with a desired thickness can be easily obtained.

In the case in which the resin composition of the present invention contains the solvent, the solvent is used such that the solid content concentration is preferably in a range of from 3% by mass to 80% by mass, and more preferably in a range of from 10% by mass to 50% by mass, from the viewpoint of workability that encompasses coating formation ability.

The adherend preferable to the resin composition of the present invention is an object that is made of: a polymer material such as a polyimide resin, a polyetheretherketone resin, a polyphenylene sulfide resin, an aramid resin, and a liquid crystal polymer; a metal material such as copper, aluminum, and stainless, etc. The shape of the adherend is not particularly limited. Two members made of the same materials as or different materials from each other, as adherends, can be adhered each other by the resin composition of the present invention, to produce an integrated composite product. In addition, a product that includes an adhesive resin composition layer, such as a coverlay film and a bonding sheet below, can be produced.

(Layered Body Including Resin Composition Layer and Layered Body)

The layered body including a resin composition layer of the present invention is a resin composition layer that consists of the resin composition of the present invention, a B-stage state resin composition layer obtained by partially curing the resin composition of the present invention, or a cured layer obtained by curing the resin composition of the present invention (hereinafter, the resin composition layers are collectively referred to as "each resin composition layer"), and among these, the B-stage state resin composition layer or the cured layer is preferable.

The layered body including a resin composition layer of the present invention preferably includes each resin composition layer and a base film in contact with at least one surface of each resin composition layer.

In the present invention, that "a resin composition layer is in a B-stage state" means a semi-cured state in which a part of the resin composition layer begins to cure, and the curing of the resin composition layer further progresses by heating or the like.

Further, the resin composition layer consisting of the resin composition of the present invention is, in the case in which the resin composition including a solvent is used, preferably a layer in which at least a part of the solvent has been removed from the resin composition of the present invention.

The layered body of the present invention is preferably a layered body including a cured layer that is obtained by curing a resin composition consisting of the resin composition of the present invention, the layered body including: a cured layer obtained by curing the resin composition of the present invention; and a base material that is in contact with at least one surface of the cured layer.

Each of the layered body including a resin composition layer of the present invention and the layered body of the present invention preferably includes a base material, and more preferably includes, on the base material, each resin composition layer consisting of the resin composition of the present invention.

The base material is not particularly limited, and a known base material can be used therefor.

Further, the base material is preferably a film-shaped base material (base film).

The base film is preferably a resin film, more preferably a polyimide film or an aramid film, and particularly preferably a polyimide film.

Neither the polyimide film nor the aramid film is particularly limited as long as it has electrical insulating property, and may be a film made of only a polyimide resin or an aramid resin, a film that contains the resin and an additive, or the like, and the side on which the resin composition layer is formed may have been subject to a surface treatment.

As the base film, a peelable film can also be used.

The thickness of the base material is not particularly limited, and is preferably from 3 μm to 125 μm.

The thickness of the resin composition layer is preferably from 5 μm to 50 μm, and more preferably from 10 μm to 40 μm.

As the method of producing the layered body including a resin composition layer of the present invention, for example, the resin composition of the present invention including a solvent is applied to the surface of a base film such as a polyimide film to form a resin composition layer, followed by removing at least a part of the solvent from the resin composition layer, and a layered body including a B-stage state resin composition layer can be produced in which a part of the resin composition layer starts to be cured in the process of removing the solvent.

The drying temperature during removing the solvent is preferably from 40° C. to 250° C., and more preferably from 70° C. to 170° C.

The drying is carried out by passing the layered body applied with the resin composition through a furnace in which hot air drying, far-infrared heating, high-frequency induction heating, and the like are performed.

If necessary, the layered body including a resin composition layer of the present invention may further include a releasable film on the surface of each resin composition layer for storage or the like.

As the releasable film, those known such as a polyethylene terephthalate film, a polyethylene film, a polypropylene film, a silicone releasable paper, a polyolefin resin coated paper, a polymethylpentene (TPX) film, and a fluororesin film are used.

The thickness of the B-stage state resin composition layer is preferably from 3 μm to 100 μm, more preferably from 5 μm to 70 μm, further preferably from 5 μm to 50 μm, and particularly preferably from 10 μm to 40 μm.

The thickness of the base film and each resin composition layer is selected depending on the application, but the base film tends to be thinner in order to improve electrical characteristics. The preferable thickness of the base film is the same as the preferable thickness of the base material described above.

In the layered body including a resin composition layer of the present invention, the ratio (A/B) of the thickness (A) of each resin composition layer to the thickness (B) of the base film is preferably from 1 to 10, and more preferably from 1 to 5. Further, it is preferable that the thickness of each resin composition layer is larger than the thickness of the base film.

As the method of producing the layered body of the present invention, for example, the resin composition of the present invention including a solvent is applied to the surface of the base film, drying is then performed in the same manner as in the case of the layered body including a resin composition layer of the present invention, followed by bringing the surface of the resin composition layer formed and an adherend into surface contact with each other and performing laminating, for example, thermal laminating at 80° C. to 150° C. Next, a method in which the layered body (base film/resin composition layer/adherend) is subject to thermal compression bonding and then the resin composition layer is cured by post-curing to form a cured layer is preferable.

The conditions for thermal compression bonding are not particularly limited as long as they enable compression bonding, and can be preferably from 150° C. to 200° C. and a pressure of from 1 MPa to 3 MPa for 1 minute to 60 minutes. The conditions for post-curing are not particularly limited, and can be preferably from 100° C. to 200° C. and from 30 minutes to 4 hours.

The thickness of the cured layer is from preferably from 3 μm to 100 μm, more preferably from 5 μm to 70 μm, further preferably from 5 μm to 50 μm, and particularly preferably from 10 μm to 40 μm.

The adherend is not particularly limited, and examples thereof can include those described above. Among these, examples preferably include a metal adherend, more preferably include a copper foil and a plated copper foil, and particularly preferably include a gold-plated copper foil.

Further, the shape, size, and the like of the adherend are not particularly limited, and those known can be used.

Further, examples of one embodiment of the layered body of the present invention include a flexible copper-clad laminate.

That is, the flexible copper-clad laminate of the present invention is preferably a flexible copper-clad laminate including a copper foil, a cured layer obtained by curing the resin composition of the present invention, and a base material, more preferably a flexible copper-clad laminate obtained by laminating at least a copper foil, a cured layer obtained by curing the resin composition of the present invention, and a base material, and particularly preferably a flexible copper-clad laminate obtained by laminating at least a copper foil, a cured layer obtained by curing the resin composition of the present invention, and a polyimide film or an aramid film.

In the flexible copper-clad laminate of the present invention, the cured layer and the copper foil may be formed on both sides of the base material, for example, the polyimide film or the aramid film. Since the resin composition of the present invention is excellent in adhesiveness to an object that contains copper, the flexible copper-clad laminate of the present invention is excellent in stability as an integrated product.

Preferable examples of the base material in the flexible copper-clad laminate of the present invention include those described above in the layered body.

The configuration of the polyimide film or the aramid film is the same as that of the polyimide film or the aramid film in the layered body of the present invention described above.

The thickness of the cured layer is not particularly limited, but is preferably from 3 μm to 50 μm, and more preferably from 10 μm to 40 μm.

The copper foil is not particularly limited, and electrolytic copper foil, rolled copper foil, or the like can be used therefore.

Further, the copper foil may be plated with a known metal such as gold or silver, or an alloy.

Another embodiment of the layered body of the present invention includes a flexible flat cable.

That is, the flexible flat cable of the present invention is preferably a flexible flat cable including a copper wire, a cured layer obtained by curing the resin composition of the present invention, and a covering material, and more preferably a flexible flat cable including a copper wire, a cured layer obtained by curing the resin composition of the present invention, and a covering material, and having the cured layer between the copper wire and the covering material. Since the resin composition of the present invention is excellent in adhesiveness to an object that contains copper, the flexible flat cable of the present invention is excellent in stability as an integrated product.

The thickness, length, cross-sectional shape, and the like of the copper wire are not particularly limited, and can be appropriately selected as desired.

Among them, copper wire having a rectangular parallelepiped cross-sectional shape is preferable.

The material of the covering material is not particularly limited as long as it is an insulating material, but a resin is preferable, and a thermoplastic resin is more preferable.

Specific examples of the material of the covering material include a polyester resin, a polyimide resin, and a polyphenylene sulfide resin.

Preferable examples of the polyester resin include polyethylene terephthalate, polyethylene naphthalate, polybutylene terephthalate, polybutylene naphthalate, polytrimethylene terephthalate, and polytrimethylene naphthalate.

In addition, the thickness, length, cross-sectional shape, and the like of the covering material are not particularly limited, and can be appropriately selected as desired.

The thickness of the cured layer is not particularly limited, but is preferably from 3 μm to 50 μm, and more preferably from 10 μm to 40 μm.

The method for producing the flexible flat cable of the present invention is not particularly limited, but for example, a method in which a layered body is produced so as to be resin film/resin composition layer/copper wire/resin composition layer/another resin film, the layered body is thermo-compression-bonded at from 80° C. to 150° C., and the resin composition layer is cured by post-curing is preferable. The post-curing conditions can be, for example, from 100° C. to 200° C., for 30 minutes to 4 hours.

The thickness of the resin film is not particularly limited, but may be from 9 μm to 50 μm.

Examples of one embodiment of the layered body including a resin composition layer of the present invention includes a bonding film, a coverlay film and an electromagnetic wave shielding film.

—Bonding Film—

The bonding film of the present invention has a layer that consists of the resin composition of the present invention or a B-stage state resin composition layer obtained by partially curing the resin composition of the present invention, and among them, the B-stage state resin composition layer is preferable.

The bonding film of the present invention preferably includes a releasable film in contact with at least one surface of the resin composition layer or the B-stage state resin composition layer.

The bonding film of the present invention may be configured to include a resin composition layer between two releasable films.

As the releasable film, those known as described above are used therefor.

The thickness of the releasable film is preferably from 20 μm to 100 μm.

The thickness of the resin composition layer is preferably from 3 μm to 100 μm, and more preferably from 10 μm to 60 μm.

Examples of the method of producing the bonding sheet of the present invention preferably include a method of applying the resin composition of the present invention including a solvent onto the surface of the releasable film, followed by drying in the same manner as in the case of the layered body including a resin composition layer of the present invention described above.

—Coverlay Film—

The coverlay film of the present invention has each resin composition layer of the present invention, and among them, a B-stage state resin composition layer or a cured layer is preferable. The coverlay film of the present invention preferably includes a base film other than a releasable film such as a polyimide film or an aramid film in contact with at least one surface of each resin composition layer.

The coverlay film of the present invention may have an aspect in which a peelable film is provided on the side opposite to the base film side in each resin composition layer.

As the base film, a known film as described above is used.

The thickness of the base film is preferably from 3 μm to 125 μm.

The thickness of the resin composition layer is preferably from 3 μm to 100 μm, and more preferably from 10 μm to 60 μm.

Examples of the method of producing the coverlay film of the present invention preferably include a method of applying the resin composition of the present invention including a solvent onto the surface of the base film, followed by drying in the same manner as in the case of the layered body including a resin composition layer of the present invention described above.

—Electromagnetic Wave Shielding Film—

The electromagnetic wave shielding film of the present invention has each resin composition layer described above, and among them, a B-stage state resin composition layer or a cured layer is preferable. The electromagnetic wave shielding film of the present invention may include a base film (including a releasable film) in contact with at least one surface of each resin composition layer.

Further, the electromagnetic wave shielding film of the present invention preferably include each resin composition layer and a protective layer.

The protective layer is not particularly limited as long as it is a layer that consists of an insulating resin composition, and any known can be used therefor. Further, the protective layer may use a resin component that is used for the resin composition of the present invention. Further, the protective layer may be formed of two or more layers that are different from each other in terms of composition or hardness.

If necessary, the protective layer may include a curing promoter, a tackifier, an antioxidant, a pigment, a dye, a plasticizer, an ultraviolet absorber, a defoamer, a leveling agent, a filler, a flame retardant, a viscosity adjuster, an anti-blocking agent, or the like.

The thickness of each resin composition layer in the electromagnetic wave shielding film of the present invention is not particularly limited, and is preferably from 3 μm to 30 μm from the viewpoints of conductivity and connectivity with a gland wiring.

Next, the specific embodiment of the method of producing the electromagnetic wave shielding film of the present invention will be described.

For example, examples thereof can include a method of coating a resin composition for a protective layer onto one surface of a peelable film and drying to form a protective layer, followed by coating the resin composition of the present invention onto the protective layer and drying to form a resin composition layer.

By the production method as exemplified, an electromagnetic wave shielding film in a layered state of each resin composition layer/protective layer/peelable film can be obtained.

The method of providing the resin composition layer and the protective layer can be realized by conventionally known coating methods such as gravure coating method, kiss coating method, die coating method, lip coating method, comma coating method, blade coating method, roll coating method, knife coating method, spray coating method, bar coating method, spin coating method, and dip coating method.

The electromagnetic wave shielding film of the present invention can be adhered to a printed wiring board by, for example, a heat press. Each resin composition layer is softened by heating and flows into a gland portion provided on the printed wiring board by pressurization. As a result, the gland wiring and the conductive adhesive are electrically connected, and the shielding effect can be enhanced.

EXAMPLES

Hereinafter, the present invention will be more specifically described based on Examples. The present invention is not limited to these Examples. Further, "parts" and "%" indicated below mean "parts by mass" and "% by mass", respectively, unless otherwise specified.

1. Raw Materials 1-1. Polyester Polyurethane Resin (A)

As the polyester to be used, a commercially available product or a synthetic product was used.

As commercially available products, ARONMELT PES-360HVXM30 and ARONMELT PES-310S30 manufactured by TOAGOSEI CO., LTD. were used.

The number average molecular weight of PES-360HVXM30 was 20,000, and the glass transition point thereof was 65° C.

The number average molecular weight of PES-310S30 was 20,000, and the glass transition point thereof was 8° C.

Synthesis of Polyester (PES-1)

A flask equipped with a stirrer, a nitrogen introducing tube, a distilling tube, and a thermometer was charged with 201 parts by mass of dimethyl terephthalate, 86 parts by mass of ethylene glycol, 140 parts by mass of neopentyl glycol, 0.9 parts by mass of trimethylolpropane, and 0.22 parts by mass of zinc acetate as a catalyst, and the temperature was raised while nitrogen was introduced, and methanol was distilled out at from 150° C. to 180° C. Thereafter, 183 parts by mass of isophthalic acid, 0.6 parts by mass of trimethylolpropane, and 0.12 parts by mass of antimony trioxide were added, and water was distilled out at from 180° C. to 210° C. Subsequently, a reaction was continued at 230° C. under reduced pressure of 200 Pa for 6 hours while gradually reducing the pressure.

The obtained polyester resin A had a number average molecular weight of 7,000 and a glass transition point of 60° C. The monomer composition by NMR analysis was terephthalic acid/isophthalic acid/ethylene glycol/neopentyl glycol=48/52/43/56 in terms of molar ratio.

Then, 180 parts by mass of the synthesized polyester resin was taken and 378 parts by mass of toluene and 42 parts by mass of methyl isobutyl ketone were added thereto, to prepare a polyester solution.

<Production of Polyester Polyurethane Resins a1 to a9>

Polyester polyurethane resins a1 to a9 obtained by the following method were used.

(1) Production of Polyester Polyurethane Resin a1

In a flask equipped with a stirrer, a reflux dehydrator, and a distillation tube, 600 parts by mass of PES-360HVXM30, 100 parts by mass of toluene, and 20 parts by mass of neopentyl glycol were charged. After raising the temperature to 120° C. to distill off 100 parts by mass of the solvent containing water, the temperature was lowered to 105° C., and 0.4 parts by mass of 2,2-bis(hydroxymethyl)propionic acid was charged and dissolved therein. Thereafter, 34 parts by mass of hexamethylene diisocyanate was added and, after 30 minutes, 0.2 parts by mass of dibutyl tin dilaurate was added. After continuing the reaction for 6 hours, a solution of polyester polyurethane resin a1 was obtained by diluting with toluene/2-propanol to adjust the solid content concentration to 30%. The number average molecular weight of the polyester polyurethane resin a1 was 36,000, and the acid value thereof was 2 mgKOH/g.

(2) Preparation of Polyester Polyurethane Resins a2 to a9>

Respective polyester polyurethane resins a2 to a9 were produced in the same manner as in the production of the polyester polyurethane resin a1 except that the polyester, the diol, and the diisocyanate shown in Table 1 were changed to parts by mass shown in Table 1, respectively, in the production of the polyester polyurethane resin a1.

TABLE 1

| Numerical unit of each component: | | Polyester polyurethane resin | | | | | | | | |
|---|---|---|---|---|---|---|---|---|---|---|
| Parts by mass | | a1 | a2 | a3 | a4 | a5 | a6 | a7 | a8 | a9 |
| Polyester resin | PES-360HVXM30 | 600 | 600 | — | — | 600 | — | 600 | 600 | 600 |
| | PES-1 | — | — | 600 | 600 | — | — | — | — | — |
| | PES-310S30 | — | — | — | — | — | 600 | — | — | — |

TABLE 1-continued

| Numerical unit of each component: | Polyester polyurethane resin | | | | | | | | |
|---|---|---|---|---|---|---|---|---|---|
| Parts by mass | a1 | a2 | a3 | a4 | a5 | a6 | a7 | a8 | a9 |
| Diol component — Neopentyl glycol | 20 | — | 65 | — | — | 20 | — | — | 133 |
| 2-butyl-2-ethyl-1,3-propanediol | — | — | — | — | — | — | 30 | — | — |
| 1,4-butanediol | — | 17 | — | — | — | — | — | — | — |
| 2,2-bis(hydroxymethyl)propionic acid | 0.4 | 0.4 | 1.4 | 0.4 | 26 | 0.4 | 0.4 | 0.5 | 0.5 |
| Isocyanate component — Hexamethylene diisocyanale | 34 | 34 | 106 | 1.5 | 34 | 34 | 34 | 3 | 216 |
| Glass transition temperature of polyester (° C.) | 65 | 65 | 62 | 62 | 65 | 8 | 65 | 65 | 65 |
| Number average molecular weight | 36,000 | 40,000 | 15,000 | 9,000 | 19,000 | 32,000 | 35,000 | 32,000 | 40,000 |
| Molecular weight per urethane bond | 920 | 1,030 | 380 | 3,000 | 490 | 820 | 920 | 10,700 | 160 |
| Acid value (mg/KOH) | 2 | 2 | 3 | 11 | 42 | 2 | 2 | 2 | 2 |

1-2. Epoxy Resin (B)

The following commercially available products were used.

(1) Epoxy Resin b1

Bisphenol A novolak type epoxy resin "EPICLON N-865" (trade name) manufactured by DIC Corporation (2) Epoxy Resin b2

Bisphenol A type epoxy resin "jER 1055" (trade name) manufactured by Mitsubishi Chemical Corporation 1-3. Flame Retardant Aluminum dimethylphosphinate "Exolit OP935" (trade name) manufactured by Clariant 1-4. Curing Promoter Imidazole-based curing promoter "Curesol C11-Z" (trade name) manufactured by Shikoku Kasei Kogyo Co., Ltd.

1-5. Solvent

A mixed solvent consisting of toluene, methyl isobutyl ketone, and 2-propanol (mass ratio=100:20:20)

Examples 1 to 8 and Comparative Examples 1 and 2

To a flask equipped with a stirrer, the raw materials shown in Table 2 were added at the mass ratio shown in Table 2, and the mixture was stirred under heating at 60° C. for 6 hours to dissolve the component (A), the component (B), and the curing promoter in a solvent, and then disperse the flame retardant, thereby producing the respective liquid adhesive compositions (resin compositions). Thereafter, a coverlay film, a bonding sheet, and adhesion test pieces A, B, and C were prepared using all these liquid adhesive compositions, and evaluated in accordance with (i) to (vi) below.

(1) Preparation of Coverlay Film

The liquid adhesive composition is roll-coated onto the surface of a polyimide film having a thickness of 25 μm so that the thickness after drying was 15 μm, and dried at 120° C. for 2 minutes to obtain a coverlay film that includes an adhesive layer.

(2) Preparation of Adhesion Test Piece A

A rolled copper foil having a thickness of 35 μm manufactured by Fukuda Metal Foil & Powder Co., Ltd. was prepared. Then, the mirror surface was layered so as to be brought into contact with the surface of the adhesive layer of the coverlay film, and laminating was performed under the conditions of 150° C., 0.3 MPa, and 1 m/min. The obtained layered body (polyimide film/adhesive layer/copper foil) was subject to thermal compression bonding for 5 minutes under the conditions of 150° C. and 3 MPa, and then further underwent post-curing at 160° C. for 2 hours in an oven, by which an adhesion test piece A was obtained.

(3) Preparation of Adhesion Test Piece B

A film (adhesive layer) on the coverlay film was brought into surface contact with the entire surface of a substrate having a comb-shaped test pattern (line width: 100 μm, line spacing: 100 μm), and was thermocompression-bonded in an oven under the conditions of 150° C. and a pressure of 3 MPa for 5 minutes, and then underwent post-curing at 160° C. for 2 hours in an oven, by which a test piece B for evaluating insulation reliability was obtained.

(4) Preparation of Bonding Sheet

A releasable polyethylene terephthalate (PET) film having a thickness of 35 μm was prepared. Then, a mixture in which copper powder "FCC-115A" manufactured by Fukuda Metal Foil & Powder Co., Ltd. was blended with the liquid adhesive composition so as to be 15% by mass with respect to the total resin solid content was roll-coated onto the surface thereof so that the thickness after drying was 25 μm, and dried at 140° C. for 2 minutes to obtain a bonding sheet having an adhesive layer.

(5) Preparation of Adhesion Test Piece C

A flexible printed wiring board having a thickness of 300 μm was prepared in which a copper circuit pattern was formed on the surface of a nickel-plated SUS 304 plate and a polyimide film having a thickness of 25 μm, and a coverlay film with a thickness of 37.5 μm having a through hole with a diameter of 1 mm was layered on the circuit pattern. First, the nickel-plated surface of the SUS304 plate was layered so as to be brought into contact with the surface of the adhesive layer of the bonding sheet, and laminating was performed under the conditions of 150° C., 0.3 MPa, and 1 m/min to obtain a layered body (SUS plate/adhesive layer/releasable PET film). Thereafter, the releasable PET film was peeled off, and the exposed surface of the adhesive layer was thermocompression-bonded to a flexible printed wiring board (a wiring board in which a copper foil wiring is formed on polyimide having a thickness of 25 μm, and a coverlay film with a thickness of 37.5 μm having a through hole with a diameter of 1 mm was layered on the copper foil wiring) at 150° C. and 3 MPa for 5 minutes, and then subjected to post-curing at 160° C. for 2 hours in an oven, by which an adhesive test piece C (SUS plate/adhesive layer/flexible printed wiring board) was prepared.

(i) Peeling Adhesion Strength

In order to evaluate the adhesiveness, the 180° peel adhesion strength (N/mm) when the copper foil of each adhesion test piece A was peeled off from the polyimide film under the conditions of the temperature of 23° C. and the tensile speed of 50 mm/min in accordance with JIS C 6481 (1996) "Test methods of copper-clad laminates for printed wiring boards" was measured. The width of the adhesion test piece during the measurement was 10 mm. As a result, those having a peeling strength of 0.5 N/mm or more were indicated as "A", those having a peel strength of 0.35 N/mm or more and less than 0.5 N/mm were indicated as "B", and those having a peel strength of less than 0.35 N/mm were indicated as "C".

(ii) Peeling Adhesion Strength After Long-Term Wet Heat Test

In order to evaluate the adhesiveness of the adhesion test piece A after being placed under an atmosphere of 60° C. and 95% RH for 1,000 hours, the 180° peel adhesion strength (N/mm) when the gold-plated copper foil of each adhesion test piece A was peeled off from the polyimide film under the conditions of the temperature of 23° C. and the tensile speed of 50 mm/min in accordance with JIS C 6481 (1996) "Test methods of copper-clad laminates for printed wiring boards" was measured. The width of the adhesion test piece during the measurement was 10 mm. As a result, those having a peeling strength reduction rate of less than 15% as compared with the initial stage were indicated as "A", those having a peeling strength reduction rate of 15% or more and less than 30% were indicated as "B", those having a peeling strength reduction rate of 30% or more and less than 50% were indicated as "C", and those having a peeling strength reduction rate of 50% or more were indicated as "D".

(iii) Solder Heat Resistance (Appearance During Soldering and Post-Solder Peeling Adhesion Strength)

The test was conducted under the following conditions in accordance with JIS C 6481 (1996).

The adhesion test piece A was floated in a solder bath at 260° C. for 60 seconds with the surface of the polyimide film up, and the presence or absence of appearance abnormalities such as swelling or peeling of the adhesive layer was visually evaluated. As a result, those in which appearance abnormalities such as swelling and peeling were not confirmed were indicated as "A", those in which an appearance abnormality such as swelling and peeling was slightly confirmed were indicated as "B", and those in which those in which an appearance abnormality such as swelling and peeling was confirmed were confirmed were indicated as "C".

Further, the test piece taken out from the solder bath was measured in terms of 180° peel adhesion strength (N/cm) when the copper foil was peeled off from the polyimide film at 23° C. in accordance with JIS C 6481(1996). The width of the adhesion test piece during the measurement was 10 mm, and the tensile speed was 50 mm/min. As a result, those having a peeling strength reduction rate of less than 15% as compared with the initial stage were indicated as "A", those having a peeling strength reduction rate of 15% or more and less than 30% were indicated as "B", those having a peeling strength reduction rate of 30% or more and less than 50% were indicated as "C", and those having a peeling strength reduction rate of 50% or more were indicated as "D".

(iv) Insulation Reliability

The adhesive test piece B was applied with a DC voltage of 50 V for 1000 hours in an atmosphere at a temperature of 85° C. and a humidity of 85% RH. Thereafter, the resistance value between the patterns was measured, and the insulation reliability was determined according to the following criteria. Practically, those having a resistance value of $10^7 \Omega$ or more that can be determined to have sufficient insulation reliability were indicated as "A", and those having a resistance value of less than $10^7 \Omega$ were indicated as "F".

(v) Conductivity (Connection Resistance)

The connection resistance value between the SUS plate and the copper foil wiring of the flexible printed wiring board of the adhesion test piece C (SUS plate/adhesive layer/flexible printed wiring board) was measured with a resistance value measuring instrument. As a result, those in which the connection resistance value was less than $0.5 \Omega$ were indicated as "A", those in which the connection resistance value was $0.5 \Omega$ or more but less than $1 \Omega$ were indicated as "B", those in which the connection resistance value was $1 \Omega$ or more but $3 \Omega$ or less were indicated as "C", and those in which the connection resistance value was more than $3 \Omega$ were indicated as "D".

(vi) Conductivity (Connection Resistance) After Soldering

The adhesion test piece C was floated in a solder bath at 260° C. for 60 seconds. Thereafter, the connection resistance value between the SUS plate and the copper foil wiring of the flexible printed wiring board of the adhesion test piece C taken out from the solder bath was measured with a resistance value measuring instrument. As a result, those in which the connection resistance value was less than $0.5 \Omega$ were indicated as "A", those in which the connection resistance value was $0.5 \Omega$ or more but less than $1 \Omega$ were indicated as "B", those in which the connection resistance value was $1 \Omega$ or more but $3 \Omega$ or less were indicated as "C", and those in which the connection resistance value was more than $3 \Omega$ were indicated as "D".

(vii) Conductivity (Connection Resistance) After Long-Term Reliability Test

The adhesion test piece C was left in a constant temperature and humidity chamber at 60° C. and 95% RH for 1,000 hours. Thereafter, the connection resistance value between the SUS plate and the copper foil wiring of the flexible printed wiring board of the adhesion test piece B was measured with a resistance value measuring instrument. As a result, those in which the connection resistance value was less than $0.5 \Omega$ were indicated as "A", those in which the connection resistance value was $0.5 \Omega$ or more but less than $1 \Omega$ were indicated as "B", those in which the connection resistance value was $1 \Omega$ or more but $3 \Omega$ or less were indicated as "C", and those in which the connection resistance value was more than $3 \Omega$ were indicated as "D".

(viii) Storage Stability of Adhesive Composition

Each of the adhesive compositions of Examples 1 to 8 and Comparative Example 1 or 2 having the compositions shown in Table 1 was put in a glass bottle, sealed, stored at 5° C. for a predetermined period, and observed in terms of crystallinity of the composition. Evaluation was performed according to the following evaluation criteria based on the storage time until the time when gelation or liquid separation of the adhesive composition was confirmed after storage for a predetermined period.

<Evaluation Criteria>
  A: 1 week or longer
  F: less than 1 week

TABLE 2

| | | | Example | | | | | | | | Comparative Example | |
|---|---|---|---|---|---|---|---|---|---|---|---|---|
| | | | 1 | 2 | 3 | 4 | 5 | 6 | 7 | 8 | 1 | 2 |
| Composition of resin composition | Polyester urethane resin (A) | a1 | 50 | — | — | — | — | — | — | 50 | — | — |
| | | a2 | — | 50 | — | — | — | — | — | — | — | — |
| | | a3 | — | — | 50 | — | — | — | — | — | — | — |
| | | a4 | — | — | — | 50 | — | — | — | — | — | — |
| | | a5 | — | — | — | — | 50 | — | — | — | — | — |
| | | a6 | — | — | — | — | — | 50 | — | — | — | — |
| | | a7 | — | — | — | — | — | — | 50 | — | — | — |
| | | a8 | — | — | — | — | — | — | — | — | 50 | — |
| | | a9 | — | — | — | — | — | — | — | — | — | 50 |
| | Epoxy resin (B) | b1 | 5 | 5 | 5 | 5 | 5 | 5 | 5 | — | 5 | 5 |
| | | b2 | 5 | 5 | 5 | 5 | 5 | 5 | 5 | 10 | 5 | 5 |
| | Flame retardant | | 5 | 5 | 5 | 5 | 5 | 5 | 5 | 5 | 5 | 5 |
| | Curing promoter | | 1 | 1 | 1 | 1 | 1 | 1 | 1 | 1 | 1 | 1 |
| | Solvent (Mixed solvent) | | 200 | 200 | 200 | 200 | 200 | 200 | 200 | 200 | 200 | 200 |
| Evaluation results | Peeling adhesion strength (N/cm) | initial | A | A | A | A | A | A | A | A | B | A |
| | | 60° C., 95% RH, after 1,000 hours | A | A | B | C | A | A | A | A | D | D |
| | | Post solder | A | A | B | C | C | C | A | B | C | A |
| | Appearance during soldering | | A | C | B | C | C | A | A | A | C | B |
| | Insulation reliability | | A | F | A | F | F | A | A | A | A | F |
| | Conductivity | Initial | A | B | A | A | A | A | A | B | A | A |
| | | Post solder | A | B | B | B | C | B | A | B | C | A |
| | | 60° C., 95% RH, after 1,000 hours storage | A | B | B | C | C | C | A | B | D | D |
| | Storage stability | | A | F | A | F | F | A | A | A | A | F |

As is clear from the results shown in Table 2, in the resin composition of Example 1 to 8, as compared with the resin composition of Comparative Example 1 or 2, a cured product (adhesive) having excellent conductivity and adhesiveness was obtained even after the long-term storage under environment of high temperature and high humidity.

As is clear from the results shown in Table 2, the resin composition of Example 1 to 8 is excellent in initial and post-solder adhesiveness, excellent in appearance after solder formation, and excellent in insulation reliability and storage stability.

The disclosure of Japanese Patent Application No. 2019-214475 filed on Nov. 27, 2019 is incorporated herein by reference in its entirety.

All publications, patent applications, and technical standards described in present specification are herein incorporated by reference to the same extent as if each individual publication, patent application, or technical standard was specifically and individually indicated to be incorporated by reference.

The invention claimed is:

1. A resin composition comprising:
a polyester polyurethane resin (A);
an epoxy resin (B), and
a metal filler,
wherein the metal filler is a conductive filler, and wherein a molecular weight per a urethane bond of the polyester polyurethane resin (A) is from 200 to 8,000.

2. The resin composition according to claim 1, wherein a diol component configuring the polyester polyurethane resin (A) contains a diol having a side chain.

3. The resin composition according to claim 1, wherein the polyester polyurethane resin (A) comprises a polyester polyurethane resin having a polyester structure that has a number average molecular weight of from 8,000 to 30,000.

4. The resin composition according to claim 1, wherein the polyester polyurethane resin (A) has a number average molecular weight of from 10,000 to 80,000.

5. The resin composition according to claim 1, wherein the polyester polyurethane resin (A) has an acid value of 0.1 mgKOH/g to 20 mgKOH/g.

6. The resin composition according to claim 1, wherein the polyester polyurethane resin (A) has a glass transition temperature of from 30° C. to 150° C.

7. The resin composition according to claim 1, wherein a content of the epoxy resin (B) is from 1 part by mass to 30 parts by mass with respect to 100 parts by mass of the polyester polyurethane resin (A).

8. The resin composition according to claim 1, wherein the epoxy resin (B) comprises a bisphenol novolak type epoxy resin.

9. The resin composition according to claim 1, wherein the polyester polyurethane resin (A) has an acid value of 0.1 mgKOH/g to 3.0 mgKOH/g.

10. The resin composition according to claim 9, wherein the resin composition is an adhesive composition.

11. A layered body including a resin composition layer, the layered body comprising:
a resin composition layer that consists of the resin composition according to claim 1, a B-stage state resin composition layer obtained by partially curing the resin composition, or a cured layer obtained by curing the resin composition; and
a base film that is in contact with at least one surface of the resin composition layer, the B-stage stage resin composition layer, or the cured layer.

12. A layered body,
comprising a cured layer obtained by curing the resin composition according to claim 1.

13. A flexible copper-clad laminate comprising:

a copper foil;

a cured layer obtained by curing the resin composition according to claim 1; and a base material.

14. A flexible flat cable comprising:

a copper wire;

a cured layer obtained by curing the resin composition according to claim 1; and a covering material.

15. An electromagnetic wave shielding film comprising a resin composition layer that consists of the resin composition according to claim 1, a B-stage state resin composition layer obtained by partially curing the resin composition, or a cured layer obtained by curing the resin composition.

\* \* \* \* \*